United States Patent [19]

Franchet

[11] 4,355,345

[45] Oct. 19, 1982

[54] HIGH CURRENT DRAINING CAPACITY MICRO-LIGHTNING ARRESTER

[75] Inventor: Léon G. Franchet, Boulogne-Billancourt, France

[73] Assignee: Claude, S.A., Boulogne-Billancourt, France

[21] Appl. No.: 196,512

[22] Filed: Oct. 14, 1980

[30] Foreign Application Priority Data

Oct. 19, 1979 [FR] France ............................... 79 25990

[51] Int. Cl.[3] ............................................... H02H 3/22

[52] U.S. Cl. ...................................... 361/117; 337/18; 361/119

[58] Field of Search ............... 361/124, 119, 117, 120; 337/17, 18, 31, 32, 404

[56] References Cited

U.S. PATENT DOCUMENTS

| | | | |
|---|---|---|---|
| 2,415,720 | 2/1947 | Angel et al. | 337/404 |
| 2,479,179 | 8/1949 | Newbill | 337/18 |
| 3,522,570 | 8/1970 | Wanaselja | 337/32 X |
| 4,009,422 | 2/1977 | Woodfill | 361/120 |
| 4,160,968 | 7/1979 | Saini | 337/404 |

*Primary Examiner*—Harry E. Moose, Jr.
*Attorney, Agent, or Firm*—Edward J. Coleman

[57] ABSTRACT

A lightning arrester including a metallic enclosure with an opening, a first electrode of electrically conducting metal traversing the enclosure opening and having a first discharge surface within the enclosure, a plug of electrically insulating material placed about the first electrode to hermetically seal the enclosure opening, and an inert gas mixture filling the enclosure. The first electrode has a thin long cylindrical portion and a flat end portion, like a nailhead, which provides the first discharge surface. Portions of the enclosure provide a second electrode having a second discharge surface within the enclosure which faces the first discharge surface, with a predetermined gap therebetween. The long thin portion of the first electrode within the enclosure is surrounded by a sleeve composed of a fusible, electrically and thermally conducting material. The melting point of the sleeve is such that any predetermined excessive heating of the first electrode due to abnormal operating conditions results in melting of the sleeve to ensure short-circuiting of both electrodes.

6 Claims, 2 Drawing Figures

HIGH CURRENT DRAINING CAPACITY MICRO-LIGHTNING ARRESTER

BACKGROUND OF THE INVENTION

The present invention concerns a high current draining capacity micro-lightning arrester, that is a protective component for avoiding damage to electrical circuits or installations which may be subject to high electrical overloads.

It is necessary to provide general or special electrical installations with protective components to avoid detrimental effects of overload for which theses installations are not designed. These protective components are known as fuses, overvoltage protection tubes and lightning arresters. Their function is to stop the transmission of an overload dangerous for a given type of installation.

The application of this type of protective component is of particular importance in the case of telephone installations, circuits and exchanges. Indeed, telephone lines and exchanges are extremely vulnerable to lightning as well as to stresses caused by induced overvoltages or to overloads caused by accidental contact of a power transport line with a telephone line.

In order to meet the requirement for protecting telephone circuits and exchanges, it has become necessary to connect a protective component, commonly known as lightning arrester, between each line wire and ground. The word lightning arrester designates a device including, in particular, electrodes placed within an enclosure containing a gaseous atmosphere.

The required characteristics of this lightning arrester are to cause no loss under normal operating conditions of the line (that is to present infinite resistance to current flow) and, on the other hand, to withstand and conduct to ground any incidental overload (that is to present a low resistance which is always less than that of the circuit to be protected while having a current draining capacity above a predetermined threshold value).

Now, a discharge tube presents under a voltage, called starting voltage, almost infinite resistance. For voltages across it greater than the starting voltage, the tube discharges and presents a low resistance. Such a tube is able to withstand high overloads, provided that its structure is sufficiently rugged, and to conduct the overload towards ground. The starting voltage value is easily predetermined by adjusting the distance between the discharge electrodes. The current draining capacity is determined by the tube structure.

Safety and reliability of telephone lines and circuits require another characteristic of protective devices, such as lightning arresters; namely, the lightning arrester must form a short-circuit whenever it becomes defective. Indeed, if this requirement is not satisfied, nothing indicates failure of the protective component and the line would be destroyed by the first occurring overload. This can be avoided only by requiring the component to indicate its own failure. In this case, since the line no longer operates, it becomes necessary to correct its defective protection by changing the out of service component in order to restore the line to normal operation. It is for this reason that the component must present a dead short-circuit and stay in this state as soon as it can no longer perform its function, regardless of the cause of the failure. Grounding of the line makes it necessary to replace the defective protection component.

A lightning arrester meeting these requirements has been described in the French Patent Application Ser. No. 75 06524, filed on Mar. 3, 1975 and assigned to the present assignee, and issued on Mar. 5, 1979 as French Pat. No. 2,303,371. This lightning arrester includes, in particular, a sealed enclosure made of a metal which is a good electrical and thermal conductor, such as silver aluminum or copper filled with an inert atmosphere such as a mixture of rare gases; e.g., argon and helium at a pressure approximating 250 torr. This enclosure is closed by means of a plug made of insulating material capable of softening at a temperature lower than the softening or melting temperatures of the other parts of the lighting arrester. A first electrode traverses this plug and presents a discharge surface facing the discharge surface of a second electrode placed within the enclosure.

In normal operation, this lightning arrester acts as any discharge tube, that is, as long as the voltage across it remains lower than its starting voltage, it is at rest. When the voltage across it becomes equal to the starting voltage value determined by the gap between both electrodes, the discharge takes place. The lightning arrester can thus conduct a discharge nominal alternating current of about 5 A, during a well-determined time, generally at least equal to 50/I sec., I being the discharge current amplitude expressed in amperes, according to the recommendations of the CCITT (advice K12 CCITT—Geneva 1977).

When the operation becomes abnormal, in particular when the incident overload considerably exceeds the draining capacities provided by the manufacturer when producing the lightning arrester, an abnormal heating of the enclosure occurs. The internal temperature of the latter reaches and exceeds the plug softening temperature. As the internal pressure is smaller than the atmospheric pressure, the softened material is sucked inwards driving with it the first electrode. The resulting motion of the first electrode reduces the interelectrode gap ultimately to zero, whereupon the two electrodes are short-circuited.

This lightning arrester thus meets the characteristics required up to now. But the users of such a device, according to their needs, intend to modify their requirements and ask the manufacturers to provide a lightning arrester which can conduct a current of about 20 A. On the other hand, in case of abnormal operation, that is when the incident overload is substantially greater than the defined draining capacities, the lightning arrester must produce a short-circuit more quickly than previously, the temperature of the external enclosure of the lightning arrester having to stay within reasonable limits in order that the connection devices (for example, fuse-holders) not be damaged.

The lightning arrester described in the above-mentioned French patent and designed for responding to a draining capacity in conformity with the present requirements, does not meet the above-mentioned last criteria; i.e., the time for establishing the electrode short-circuit is too long for being acceptable under the future environment conditions of the lightning arrester (plug-in case in thermoplastic maaterial, for example). On the other hand, due to the fact that this time is important, the area of the lightning arrester external enclosure located near the interelectrode gap is substantially heated up. The temperature of this area then exceeds the allowed limits.

SUMMARY OF THE INVENTION

Accordingly, it is an object of the present invention to provide an improved lightning arrester which meets the user's new requirements discussed hereinabove.

This and other objects, advantages and features are attained, in accordance with the invention, by a micro-lightning arrester, including an enclosure, an opening within this enclosure, a first electrode traversing this opening and having a first discharge surface within the enclosure, a plug placed between the first electrode and the enclosure in order to seal hermetically the opening onto this electrode, a second electrode presenting a second discharge surface within the enclosure facing the first discharge surface, and a gaseous atmosphere filling the enclosure, which is characterized in that the first electrode is surrounded by a sleeve in electrical and thermal contact with this first electrode, this sleeve being composed of fusible, electrically and thermally conducting material having a melting point such that any predetermined excessive heating of said first electrode due to abnormal operating conditions of the lightning arrester results in the melting of said sleeve, thereby ensuring the short-circuit of both electrodes.

Another feature of the invention relates to the fact that the first electrode has a relatively thin long cylindrical portion and a flat end portion presenting a relatively significant discharge surface, the entire first electrode being composed of an electrically conducting metal capable of withstanding high temperatures, which provides the lightning arrester with a high current draining capacity.

Another feature of the invention relates to the fact that the sleeve is in thermal contact with the rear face of the flat end portion of the first electrode.

Another feature of the invention relates to the fact that one end of the sleeve is closely associated with the rear face of the flat end portion of said first electrode.

According to another feature of the invention, the sleeve is made of a material having an emissive power lower than that of the metal constituting the first electrode.

According to another feature of the invention, the external diameter of the sleeve is at most equal to the diameter of the first electrode flat end portion so that only both electrodes participate in a discharge.

According to another feature of the invention, the plug is made of an insulating material, and the material of the enclosure is wettable by the melted sleeve material.

BRIEF DESCRIPTION OF THE DRAWINGS

Various other features will be disclosed from the following description which is given by way of non-limited example and with reference to the accompanying drawings, in which.

DESCRIPTION OF PREFERRED EMBODIMENT

Figure 1:
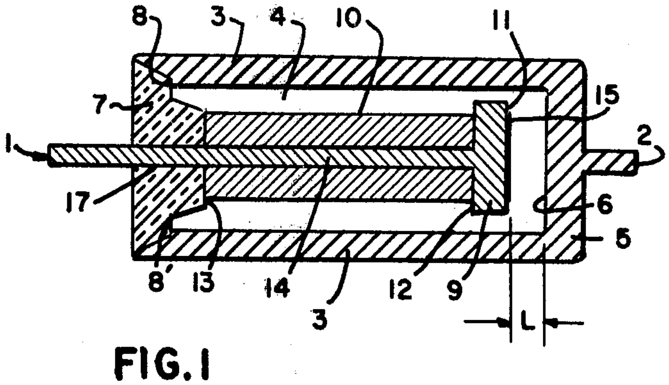
FIG. 1, a cross-section longitudinal view of an embodiment of the lightning arrester, according to the invention.

The lightning arrester of FIG. 1 includes, in particular, two discharge electrodes 1 and 2, a sealed enclosure possessing a metallic part constituting the lateral wall 3 and the base 5 of the enclosure, and a part 7, forming a plug made of electrically insulating material selected to provide a sealed bond with the wall 3.

The discharge electrode 1 traverses the enclosure through a gas-tight opening 17 provided in the insulating material of the plug 7. The latter is itself sealed to the enclosure lateral wall 3 around its edge, which seats on the internal edge 8 and 8' of this wall. This edge may have a shoulder shape.

The part of the discharge electrode 1 located within the enclosure has a general nail shape, that is, has a relatively thin long cylindrical portion 14 ending by a cylindrical head (or flat end portion) 9, having a diameter substantially greater than the long cylindrical portion. Electrode 1 is made of a good, electrically conducting metal capable of withstanding high temperatures (molybdenum, for example).

The discharge electrode 2 is constituted by the enclosure base 5.

The facing internal ends of the electrodes 1 and 2 respectively reference 11 and 6 are separated by an interelectrode gap of length L.

It is known that one of the main characteristics of lightning arresters, that is the starting voltage, depends upon the discharge gap between the electrodes. It is obvious that this voltage increases with the length of this gap and that, on the other hand, the precision in the relative positioning of the electrodes cannot be lower than a limit value, a few hundredths of millimeters, for example. It is thus interesting, in order to increase the relative precision, to provide a relatively critical interelectrode gap. Despite this fact, in order to have a starting voltage complying with the users' requirements, one or both facing electrode ends is covered with an emissive material, for example an emissive mixture of barium, zirconium and aluminum. According to a preferred embodiment, the anterior face 11 of the head 9 of electrode 1 is covered with a layer 15 of barium.

The external parts of the discharge electrodes have, for example, the form of pins whose lengths and shapes enable them to fit into the special contact clips (not shown) for holding the device.

The lightning arrester of FIG. 1, according to a primary feature of the invention, also includes a tube or sleeve 10 enclosing the internal long cylindrical part 14 of the electrode 1. This sleeve is made of a fusible material which is a good electrical and thermal conductor and has an emissive power, or capability, lower than that of the electrode material. Brass will be chosen, for example. The internal diameter of sleeve 10 is almost equal to the external diameter of the long cylindrical part 14 of electrode 1. The external diameter of sleeve 10 is at most equal to the diameter of the head 9 of electrode 1. One end of this sleeve contacts the rear face 12 of the head 9. Its other end rests against the internal face 13 of the insulating plug 7.

The manufacture of the lightning arrester of FIG. 1 is performed as follows: First, the discharge electrode 1 is shaped from a metal bar of molybdenum, according to the chosen embodiment. The anterior face 11 of the head 9 of this electrode is further covered with an emissive material 15, preferably barium.

The sleeve 10 is then placed around the long portion 14 of the electrode 1. It is the same for the insulating plug 7 which presents a central aperture 17 through which is introduced the free end of the electrode 1.

The assembly of electrode 1 - sleeve 10 - plug 7 is vertically placed on a graphite plate (not shown), the free end of the electrode 1 being introduced in a hole contained in this plate. Under gravity force, the whole system is held in vertical position, the rear face 12 of the head 9 of the electrode resting against the sleeve upper end.

The graphite plate bearing a plurality of equipped electrodes is then placed in a furnace. By appropriately choosing the vitreous material constituting the plug 7 and the fusible material constituting the sleeve 10, simultaneously the sealing of the plug around the cylindrical long part 14 of the electrode as well as the brazing of the sleeve on the molybdenum electrode are carried out. Brass used for the sleeve meets this requirement. This brazing must be done at least between the sleeve upper end and the rear face 12 of the head 9 of electrode 1.

Simultaneously, the enclosure is pumped out and then filled with an inert atmosphere 4 at a pressure lower than normal atmospheric pressure. The inert atmosphere is a mixture of rare gases such as argon and helium, under a pressure of 250 torr, for example. When the gas filling has reached this pressure, the plug 7 (carrying the electrode 1 and the sleeve 10) is sealed to the enclosure. The depth to which this electrode is inserted is adjusted when sealing the plug so that the interelectrode gap L corresponds to the predetermined value of the lightning arrester operating threshold; this value being that of the starting voltage $V_O$. This value also corresponds to the maximum voltage of be withstood by the lines or circuits to be protected.

The lightning arrester is then completely equipped and ready to operate.

In normal operation, this lightning arrester acts as any discharge tube, that is, as long as the voltage across its terminals is less than the starting voltage $V_O$, it remains at rest.

When the voltage across the lightning arrester becomes equal to $V_O$, the discharge takes place.

Since the device possesses massive electrodes, i.e., the massive nail head extension 9 of the electrode 1 and the base 5 of the enclosure for the electrode 2, it can withstand significant overloads, which it conducts towards ground. The latter is the reference potential to which is connected the external part of the electrode 2. It is to be noted that the discharge takes place only between the two facing faces 6 and 11 (or 6 and 15 when the anterior face 11 of the head 9 is covered with a layer of barium 15) of electrodes 1 and 2. Indeed, since the sleeve 10 has an external diameter smaller than the diameter of the head 9 and is made of a material having an emissive power less than that of the facing parts of the electrodes, it plays no part in the discharge.

When the lightning arrester is placed under abnormal operating conditions, its two electrodes are short-circuited. Indeed, upon the occurrence of any abnormal operation, in particular, when the incident overload considerably exceeds the current-draining capacities intended by the manufacturer, abnormal heating of the electrodes is caused to take place.

The discharge electrode 2, which is constituted by the base 5 of the enclosure, easily dissipates this heating, the relatively massive enclosure acting as a heat-sink. The increase of the enclosure temperature is thus relatively slow, in particular when the lightning arrester is in the open air. It is not the same for the discharge electrode 1, which has a much smaller mass, in particular due to its long cylindrical portion 14, and which is located inside the sealed enclosure. On the other hand, the insulating vitreous plug 7 is not a good thermal conductor. It may then result in excessive heating of this electrode 1 and inside the enclosure which may cause the destruction of components, particularly those in plastic material, placed against the lightning arrester. The introduction of the sleeve according to the invention avoids all these serious drawbacks.

Indeed, as the sleeve 10, which is a good thermal conductor, contacts the electrode 1, it is brought to a temperature approximating that of the head 9 of the electrode 1. This temperature reaches and exceeds the melting temperature of the material constituting the sleeve.

Figure 2:
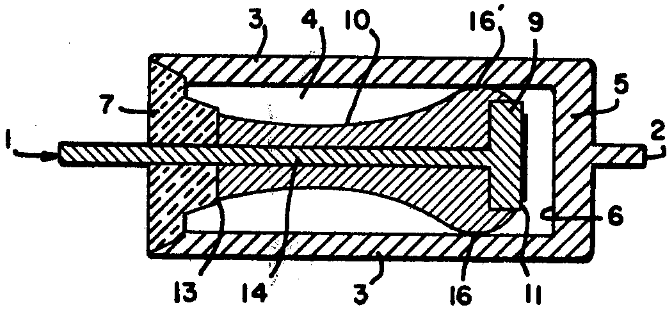
FIG. 2, a cross-section longitudinal view of the lightning arrester of FIG. 1 in a short-circuit state.

Then, as the softening point of this material has been reached, the sleeve 10 has no longer a rigid consistency and due to the surface stress, an annular extension of the sleeve is generated in the neighborhood of the electrode head 9. This extension contacts the internal wall of the lightning arrester enclosure as shown by FIG. 2. This results in the short-circuit of electrodes 1 and 2 at contact points 16 and 16′ of the sleeve and of the enclosure lateral wall. This short-circuit causes termination of heat dissipation inside the enclosure. A judicious choice of the materials used, on the one hand, for the enclosure and on the other hand, for the sleeve is required in order that the contacts 16 and 16′ are made with wetting. In this way, these contacts are definitively established and persist after the solidification of the sleeve 10 due to the enclosure cooling.

The lightning arrester, according to the invention, thus presents infinite resistance when the voltage across it remains less than a determined protection threshold value $V_O$, and a low resistance enabling high current draining when the voltage across it reaches the value $V_O$. In the described embodiment, the lightning arrester is able to conduct currents up to 30 A d.c., the residual voltage across it being smaller than 20 volts. It can also drain pulses of current reaching peak values of 10,000 amperes (8/20 wave) occurring at intervals of 30 seconds between two consecutive shock waves. It is rendered unserviceable by permanent currents a.c. (50 Hz) of intensity lying between 5 and 50 amperes. The destruction of the lightning arrester is caused by the dead short-circuit of the electrodes, and it is obvious that the sleeve arrangement is such that the position of the lightning arrester is not critical.

Moreover, this lightning arrester is practically fireproof and the external wall of its enclosure is not subjected to excessive heating. Indeed, most of the heat dissipation caused by the electrode 1 in case of overloads is absorbed by the sleeve. It results in a quick fusion of this sleeve and a short-circuit of the electrodes quicker than in the well-known lightning arresters, the massive shape of these electrodes nevertheless conferring an increased current draining capacity on this lightning arrester.

According to a preferred embodiment, the plug 7 is made of a vitreous material whose melting temperature is lower than that of the other lightning arrester components except the sleeve. In this way, the short-circuit of the electrodes by melting of the sleeve may be accompanied by the short-circuit of the electrodes according to the process described in the aforementioned French Pat. No. 2,303,371; i.e., the rise in temperature of the sleeve is transmitted to the plug. The plug temperature reaches its melting temperature. As the material of this plug has reached its softening point, the electrode 1 is no longer rigidly supported and is sucked inside the enclosure due to the pressure difference between the external atmospheric pressure and the internal pressure (250 torr). This electrode 1 then comes in to contact with the enclosure bottom which constitutes the second electrode. These arrangements thus increase the safety offered by the micro-lightning arrester disclosed in the present invention.

Although the invention has been described with respect to a specific embodiment, it will be appreciated that modifications and changes may be made by those skilled in the art without departing from the true spirit and scope of the invention. For example, the specific numerical values given may vary with different applications.

I claim:

1. A high current draining capacity micro-lightning arrester including an enclosure, an opening in said enclosure, a first electrode traversing said enclosure opening and having a first discharge surface within the enclosure with said first electrode having a relatively thin long cylindrical portion and a flat end portion presenting a relatively significant discharge surface and said entire first electrode composed of an electrically conducting metal capable of withstanding high temperatures which provide a high current draining capacity, a plug placed between the first electrode and the enclosure in order to hermetically seal the enclosure opening about said first electrode, a second electrode presenting a second discharge surface within said enclosure facing said first discharge surface, and a gaseous atmosphere filling the enclosure, characterized in that said first electrode is surrounded by a sleeve in electric and thermal contact with the rear face of said first electrode flat end portion, said sleeve being composed of fusible, electrically and thermally conducting material having a melting point such that any predetermined excessive heating of said first electrode due to abnormal operating conditions of the lightning arrester results in the melting of said sleeve, thereby ensuring the short-circuit of both electrodes.

2. The micro-lightning arrester according to claim 1 wherein one end of said sleeve is closely associated with the rear face of the first electrode flat end portion.

3. The micro-lightning arrester according to claim 1 wherein said sleeve is composed of a material having an emissive power lower than that of the material constituting the first electrode.

4. The micro-lightning arrester according to claim 1 wherein the external diameter of said sleeve is at most equal to the diameter of the first electrode flat end portion so that only both electrodes participate in a discharge.

5. The micro-lightning arrester according to claim 1 wherein said plug is composed of an insulating material.

6. The micro-lightning arrester according to claim 5 wherein the material of said enclosure is wettable by the melted sleeve material.

* * * * *